United States Patent
Maeda

(10) Patent No.: US 9,979,245 B2
(45) Date of Patent: May 22, 2018

(54) ROTOR FOR ELECTRIC MOTOR, ELECTRIC SUPERCHARGER, AND ELECTRIC-MOTOR ASSISTED SUPERCHARGER

(71) Applicant: TOYOTA JIDOSHA KABUSHIKI KAISHA, Toyota-shi, Aichi-ken (JP)

(72) Inventor: Osamu Maeda, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 95 days.

(21) Appl. No.: 14/957,947

(22) Filed: Dec. 3, 2015

(65) Prior Publication Data

US 2016/0190882 A1 Jun. 30, 2016

(30) Foreign Application Priority Data

Dec. 5, 2014 (JP) ................. 2014-246747

(51) Int. Cl.
*H02K 1/27* (2006.01)
*H02K 1/28* (2006.01)
(Continued)

(52) U.S. Cl.
CPC ................. *H02K 1/28* (2013.01); *F01D 5/02* (2013.01); *F01D 15/00* (2013.01); *F01D 25/24* (2013.01);
(Continued)

(58) Field of Classification Search
CPC ........ H02K 1/2733; H02K 1/278; H02K 1/28; H02K 7/003; H02K 9/22;
(Continued)

(56) References Cited

U.S. PATENT DOCUMENTS 4,631,807 A * 12/1986 Kawada ............... H02K 1/2773
29/418
4,674,178 A * 6/1987 Patel ..................... H02K 1/278
29/598

(Continued)

FOREIGN PATENT DOCUMENTS

CN 102124635 A 7/2011
EP 0243187 A2 10/1987
(Continued)

OTHER PUBLICATIONS

Chinese Patent Office, Office Action in Chinese application No. 201510882857.5, dated Aug. 29, 2017, 14 pages.

*Primary Examiner* — Audrey K Bradley

(74) *Attorney, Agent, or Firm* — Hunton Andrews Kurth LLP

(57) ABSTRACT

A rotor for an electric motor and a rotor sub-assembly that is maintained at an appropriate position without using a spacer and without applying excessive compressive stress to a magnet. A magnet and an end-plate are press-fitted into a ring-shaped member to form a rotor sub-assembly. A shaft is passed through the rotor sub-assembly. A fastener is fastened onto the shaft, and fixes the axial position of the rotor sub-assembly with respect to the shaft. The shaft includes a step at which the shape of the shaft changes between a small-diameter portion and a large-diameter portion.

4 Claims, 3 Drawing Sheets

(51) Int. Cl.
*F01D 5/02* (2006.01)
*F01D 25/24* (2006.01)
*F04D 25/06* (2006.01)
*H02K 7/00* (2006.01)
*H02K 9/22* (2006.01)
*F01D 15/00* (2006.01)
*F02B 37/10* (2006.01)
*F04D 29/28* (2006.01)
*H02K 5/128* (2006.01)

(52) U.S. Cl.
CPC .............. *F02B 37/10* (2013.01); *F04D 25/06* (2013.01); *F04D 29/284* (2013.01); *H02K 1/278* (2013.01); *H02K 1/2733* (2013.01); *H02K 7/003* (2013.01); *H02K 9/22* (2013.01); *F05D 2220/40* (2013.01); *F05D 2240/60* (2013.01); *H02K 2005/1287* (2013.01)

(58) Field of Classification Search
CPC ... H02K 2005/1287; F01D 5/02; F01D 15/00; F01D 25/24; F04D 25/06; F04D 29/284; F02B 37/10; F05D 2220/40; F05D 2240/60
See application file for complete search history.

(56) References Cited

U.S. PATENT DOCUMENTS

| | | | |
|---|---|---|---|
| 4,827,170 A | 5/1989 | Kawamura et al. | |
| 5,121,605 A * | 6/1992 | Oda | F01D 5/10 290/52 |
| 6,437,474 B1 * | 8/2002 | Chu | H02K 1/2773 29/598 |
| 8,096,126 B2 | 1/2012 | Shibui et al. | |
| 2003/0094867 A1 | 5/2003 | Wolters | |
| 2007/0024141 A1 * | 2/2007 | Drexlmaier | H02K 1/278 310/156.19 |
| 2011/0254399 A1 | 10/2011 | Blanc et al. | |
| 2014/0125208 A1 | 5/2014 | Yamashita et al. | |

FOREIGN PATENT DOCUMENTS

| | | | | |
|---|---|---|---|---|
| JP | 57000043 A | * | 1/1982 | ............. H02K 5/167 |
| JP | S62-254649 A | | 11/1987 | |
| JP | 2003-520555 A | | 7/2003 | |
| JP | 2006-333660 A | | 12/2006 | |
| JP | 2007-321675 A | | 12/2007 | |
| JP | 2008-029166 A | | 2/2008 | |
| JP | 2008-095650 A | | 4/2008 | |
| JP | 2011-83136 A | | 4/2011 | |
| JP | 4671177 B2 | | 4/2011 | |
| JP | 2012-500613 A | | 1/2012 | |
| JP | 2012-255356 A | | 12/2012 | |
| WO | 2010020334 A2 | | 2/2010 | |

* cited by examiner

ROTOR FOR ELECTRIC MOTOR, ELECTRIC SUPERCHARGER, AND ELECTRIC-MOTOR ASSISTED SUPERCHARGER

CROSS-REFERENCE TO RELATED APPLICATION

The present application claims priority to Japanese Patent Application No. 2014-246747 filed on Dec. 5, 2014, which is incorporated herein by reference in its entirety.

BACKGROUND OF THE INVENTION

Field of the Invention

Embodiments of the present invention relate to a rotor for an electric motor, an electric supercharger, and an electric-motor assisted supercharger. More particularly, embodiments of the present invention relate to a rotor for an electric motor, an electric supercharger and an electric-motor assisted supercharger that are suitable for use as vehicle-mounted equipment.

Background Art

An electric-motor assisted supercharger to be mounted in a vehicle is disclosed in Japanese Patent Laid-Open No. 2007-321675. The electric-motor assisted supercharger includes a shaft that extends from a turbine side to a compressor side. A rotor sub-assembly is mounted on the shaft so as to be positioned between the turbine and the compressor.

The rotor sub-assembly includes a ring-shaped magnet. The magnet is press-fitted into the inside of a ring-shaped member. End-plates are press-fitted into the two ends of the ring-shaped member so as to come in contact with the two ends of the magnet. Spacers are disposed on both a turbine side and a compressor side at positions that are further on the outer side of the end-plates. The spacers are provided so as to sandwich the two sides of the ring-shaped member without contacting the adjacent end-plates.

In the aforementioned Japanese Patent Laid-Open No. 2007-321675, a small-diameter portion that passes through the rotor sub-assembly, and a large-diameter portion that connects to the small-diameter portion are provided in the shaft of the electric-motor assisted supercharger. The position of the rotor sub-assembly on the shaft is determined by one of the spacers contacting against an end portion of the large-diameter portion. The aforementioned position can be maintained by applying compressive stress to the other spacer so that the aforementioned one of the spacers does not separate from the end portion of the large-diameter portion.

In the aforementioned Japanese Patent Laid-Open No. 2007-321675, the compressive stress that is applied to the two spacers acts only on the ring-shaped member, and is not transmitted to either of the end-plates. Consequently, according to this configuration, the rotor sub-assembly can be maintained at an appropriate position on the shaft without applying excessive compressive stress to the magnet.

LIST OF RELATED ART

Following is a list of patent literatures which the applicant has noticed as related arts of the present invention.
[Patent Literature 1]
Japanese Patent Laid-Open No. 2007-321675
[Patent Literature 2]
Japanese Patent Laid-Open No. 2008-095650
[Patent Literature 3]
Japanese Patent Laid-Open No. 2008-029166
[Patent Literature 4]
Japanese Patent Laid-Open No. 2006-333660

Problem to be Solved by Embodiments of the Invention

In a configuration that requires a spacer at both ends of a rotor sub-assembly, the size of the rotor sub-assembly structure must increase due to the presence of the spacers.

Embodiments of the present invention have been made to solve the above described problem, and an object of an embodiment of the present invention is to provide a rotor for an electric motor in which a rotor sub-assembly can be maintained at an appropriate position without using a spacer and without applying excessive compressive stress to a magnet.

A further object of an embodiment of the present invention is to provide an electric supercharger equipped with a rotor having the above described characteristics, and an electric-motor assisted supercharger.

SUMMARY

To achieve the above mentioned purpose, a first aspect of an embodiment of the present invention is a rotor for an electric motor. The rotor comprises: a ring-shaped rotor sub-assembly including a ring-shaped member, a magnet and an end-plate; a shaft that passes through the rotor sub-assembly; and a fastening member that is fastened to the shaft, and that fixes an axial position of the rotor sub-assembly with respect to the shaft; wherein: the magnet is disposed between the ring-shaped member and the shaft so as to contact an inner wall of the ring-shaped member; the shaft includes a step at which a shape of the shaft changes between a small-diameter portion and a large-diameter portion, and a reference face that is an end face of the large-diameter portion that is exposed to outside of the small-diameter portion; and the end-plate is mounted to the ring-shaped member so as to oppose an axial end portion of the magnet and has a positioning portion, said positioning portion includes an opposing face contacting the reference face and said positioning portion includes a pressure receiving face receiving a fastening force produced by the fastening member, and said small-diameter portion is inserted into the positioning portion.

A second aspect of an embodiment of the present invention is the rotor according to the first aspect discussed above, wherein the end-plate is mounted to the ring-shaped member so as to contact the axial end portion of the magnet.

A third aspect of an embodiment of the present invention is the rotor according to the first or second aspect discussed above, wherein: the opposing face of the position portion of the end-plate faces the magnet, and the opposing face of the positioning portion contacts the reference face of the shaft; an outer diameter of the shaft is maintained at a diameter that is less than an inner diameter of the magnet over a length that is equal to or greater than an internal length of the rotor sub-assembly from the reference face; and the internal length is a length from the magnet side face of the positioning portion to an end portion of the rotor sub-assembly on a different side to the positioning portion side.

A fourth aspect of an embodiment of the present invention is an electric supercharger, comprising: a rotor according to the third aspect discussed above; a stator of an electric motor that is disposed at an outer circumference of the rotor sub-assembly; and a compressor impeller that is mounted to the shaft so as to be positioned between the pressure receiving face of the positioning portion and the fastening member.

The fifth aspect of an embodiment of the present invention is an electric-motor assisted supercharger, comprising: an electric supercharger according to the fourth aspect discussed above; a turbine impeller that is mounted to the shaft so as to be positioned on an opposite side to the compressor impeller so as to sandwich the rotor sub-assembly therebetween; and a turbine housing that guides exhaust gas of an internal combustion engine to the turbine impeller.

The sixth aspect of and embodiment of the present invention is the electric-motor assisted supercharger according to the fifth aspect discussed above, wherein: the rotor sub-assembly further comprises a turbine-side end-plate that is mounted to the ring-shaped member so as to oppose an axial end portion of the magnet from the turbine impeller side, and that allows passage of the shaft therethrough; and the turbine-side end-plate comprises a heat insulating member at a site that contacts the shaft.

ADVANTAGES OF EMBODIMENTS OF THE PRESENT INVENTION

Figure 1:
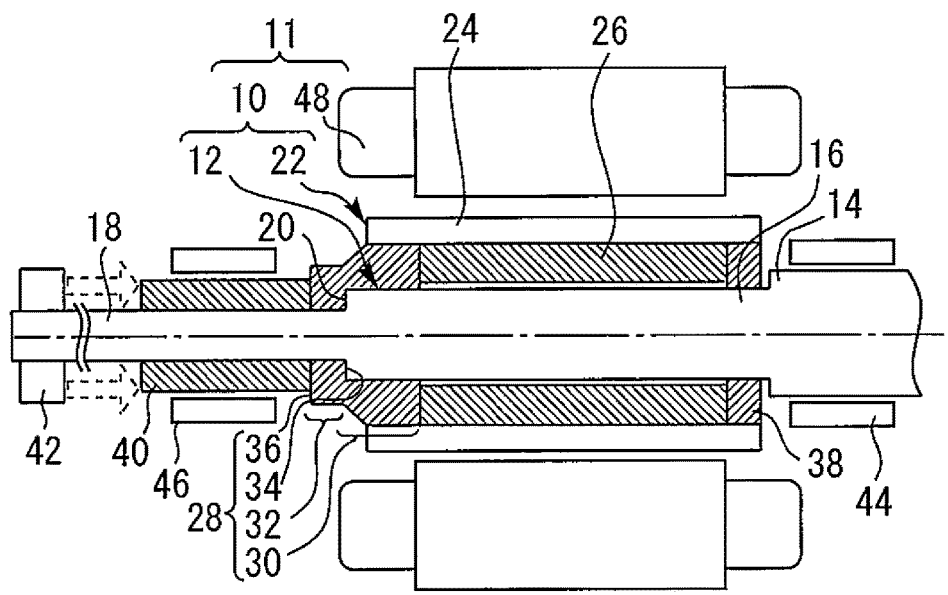
FIG. 1 is a view illustrating the configuration of an electric motor 11 having a rotor 10 as a first embodiment of the present invention.

According to the first aspect discussed above, a rotor sub-assembly is fixed at an appropriate position on a shaft in a state in which an opposing face of an end-plate contacts a reference face of the shaft. A fastening force produced by a fastening member acts only on a positioning portion of the end-plate, and does not act on a magnet. Therefore, according to embodiments of the present invention a rotor sub-assembly can be maintained at an appropriate position without using a spacer and without applying excessive compressive stress to a magnet.

According to the second aspect discussed above, the axial position of the magnet can be accurately determined by determining the position of the end-plate. Therefore, according to the present invention, the position of the magnet on the shaft can be appropriately maintained.

According to the third aspect discussed above, the outer diameter of the shaft at the portion that is inserted into the rotor sub-assembly is maintained at a diameter that is less than the inner diameter of the magnet, until the reference face contacts against the positioning portion, in the course of the shaft being inserted into the rotor sub-assembly. According to this configuration, an external compressive force does not act on an end face of the rotor sub-assembly on a side from which the shaft is inserted, in a state in which the positions of both members are determined. Consequently, according to the present invention, it is possible to reliably prevent a fastening force produced by a fastening member from acting on a magnet.

According to the fourth aspect discussed above, an electric supercharger is realized that has a structure in which a compressor impeller is interposed between a positioning portion of a rotor sub-assembly and a fastening member. In this electric supercharger, a fastening force produced by a fastening member is transmitted through the compressor impeller to the rotor sub-assembly, and is transmitted to the shaft from a place at which the rotor sub-assembly and the shaft are contacting in the axial direction. When attaching a fastening member to a shaft, in some cases a force produced by the attachment is applied as bending stress at a place where the rotor sub-assembly and the shaft come in contact. In the present invention the rotor sub-assembly contacts the shaft at an end portion that is on the compressor impeller side. Therefore, according to the present invention, a region at which the shaft deforms due to the aforementioned bending stress can be limited to a region from the fastening member to the end portion of the rotor sub-assembly on the compressor impeller side. The influence on rotation that arises due to the deformation in this region can be eliminated by subjecting the fastening member to a balance correction process. Therefore, according to the present invention, an electric supercharger can be realized that exhibits excellent noise characteristics and vibration characteristics.

According to the fifth aspect discussed above, an electric-motor assisted supercharger is realized having a structure in which a rotor sub-assembly is interposed between a turbine impeller and a compressor impeller. According to the configuration in which spacers are disposed on both sides of a ring-shaped member, heat that is transmitted from the turbine side arrived at the magnet by passing along the following two routes:

1. Turbine→shaft→turbine-side spacer→ring-shaped member→magnet
2. Turbine→shaft→(end-plate on the turbine side if an end-plate is present)→magnet In the structure of embodiments of the present invention, since no spacers are provided, the above described heat transfer route 1 does not arise. Therefore, according to embodiments of the present invention an electric-motor assisted supercharger can be realized in which it is difficult for heat to be transmitted to a magnet.

According to the sixth aspect discussed above, the amount of heat that is transmitted along the above described heat transfer route 2 and that arrives at the magnet can be suppressed while realizing a configuration in which end-plates are disposed on both sides of the magnet. Therefore, according to embodiments of the present invention, in an electric-motor assisted supercharger having a configuration that includes end-plates on both sides of a magnet, the heat resistance characteristics of the magnet can be enhanced.

DETAILED DESCRIPTION

First Embodiment

Configuration and Fundamental Effects of First Embodiment

FIG. 1 is a view illustrating the configuration of an electric motor 11 having a rotor 10 as a first embodiment of the present invention. The rotor 10 shown in FIG. 1 includes a shaft 12. The shaft 12 includes a base portion 14, a large-diameter portion 16, and a small-diameter portion 18 which have different outer diameters compared to each other. The base portion 14, the large-diameter portion 16, and the small-diameter portion 18 have cylindrical shapes that are mutually concentric. A reference face 20 is formed at a stepped portion at which the shape of the shaft 12 changes between the large-diameter portion 16 and the small-diameter portion 18. More specifically, the reference face 20 is an end face of the large-diameter portion 16 that is exposed at the outer side of the small-diameter portion 18, and has an annular shape in the present embodiment.

A rotor sub-assembly 22 is mounted on the shaft 12. The rotor sub-assembly 22 includes a ring-shaped member 24. The ring-shaped member 24 is a cylindrical member in which both ends are open. An annular magnet 26 is housed inside the ring-shaped member 24. The magnet 26 has an inner diameter that is slightly larger than the large-diameter portion 16 of the shaft 12, and has an outer diameter that is approximately equal to the inner diameter of the ring-shaped member 24. The magnet 26 is inserted into the ring-shaped member 24 by press-fitting. In the present embodiment, the magnet 26 is a member that rotates at a high speed together with the shaft 12. By performing the above described press-fitting, a force in a contraction direction that opposes a centrifugal force at the time of high-speed rotation can be applied to the magnet 26, and thus the breaking strength of the magnet 26 can be enhanced.

An end-plate 28 is disposed on one end side of the magnet 26 (i.e., the side of the small-diameter portion 18 in FIG. 1). The end-plate 28 includes a fixing portion 30 and a positioning portion 32. The fixing portion 30 has an inner diameter that is approximately equal to the large-diameter portion 16 of the shaft 12, and an outer diameter that is approximately equal to the inner diameter of the ring-shaped member 24, and is inserted into the ring-shaped member 24 by press-fitting.

The positioning portion 32 is formed integrally with the fixing portion 30, and has an inner diameter that is approximately equal to the small-diameter portion 18 of the shaft 12. Because of the difference between the inner diameter of the fixing portion 30 and the inner diameter of the positioning portion 32, a face that opposes the reference face 20 of the shaft 12 is formed in the positioning portion 32. Hereunder, this face is referred to as "opposing face 34". Further, a face of the positioning portion 32 on an opposite side to the opposing face 34 is referred to as "pressure receiving face 36".

On the opposite side to the end-plate 28, the rotor sub-assembly 22 includes a second end-plate 38 which is provided so that the magnet 26 is sandwiched between the second end-plate 38 and the end-plate 28. The second end-plate 38 has an inner diameter that is approximately equal to the large-diameter portion 16 of the shaft 12, and an outer diameter that is approximately equal to the inner diameter of the ring-shaped member 24, and is inserted into the ring-shaped member 24 by press-fitting.

The end-plate 28 and the second end-plate 38 each come in contact with an axial end face of the magnet 26, and apply a moderate compressive load to the magnet 26. The breaking strength of the magnet 26 is enhanced by receiving the moderate compressive load. In this respect also, the configuration of the present embodiment enhances the breaking strength of the magnet 26.

The rotor sub-assembly 22 is mounted on the shaft 12 in a state in which the magnet 26, the end-plate 28 and the second end-plate 38 have been press-fitted into the ring-shaped member 24. At such time, the small-diameter portion 18 and the large-diameter portion 16 of the shaft 12 are inserted inside the end-plate 28 and the second end-plate 38 by mating sockets and spigots. Because the inner diameter of the magnet 26 is slightly larger than the external shape of the large-diameter portion 16 as described above, a slight clearance is secured between the shaft 12 and the magnet 26. According to this configuration, it is possible to avoid a situation in which stress is applied to the magnet 26 from the shaft 12 in the same direction as a centrifugal force that arises during rotation, and thus a loss of the breaking strength of the magnet 26 can be prevented.

The relative position between the shaft 12 and the rotor sub-assembly 22 is determined by the reference face 20 of the shaft 12 coming in contact with the opposing face 34 of the end-plate 28. In this state, a bearing spacer 40 having the same outer diameter as the base portion 14 is mounted on the small-diameter portion 18 of the shaft 12. Further, a nut 42 is fastened onto the shaft 12 at a stage when all of the components that should be mounted on the shaft 12 have been mounted. The present embodiment is configured so that a fastening force generated by the nut 42 (indicated by broken-line arrows in FIG. 1) reaches one end of the bearing spacer 40. The fastening force is transmitted to the pressure receiving face 36 of the end-plate 28 through the bearing spacer 40. Consequently, when the nut 42 is fastened onto the shaft 12, the rotor sub-assembly 22 can be fixed on the shaft 12 in an accurate positional relationship in which the opposing face 34 contacts the reference face 20.

As shown in FIG. 1, the shaft 12 is rotatably held by bearings 44 and 46 each of which holds the base portion 14 and the bearing spacer 40, respectively. Further, a stator 48 of the electric motor is disposed at the outer circumference of the rotor sub-assembly 22.

As described above, the end face of the end-plate 28 comes in contact with the end face of the magnet 26 in the present embodiment. Therefore, the positional relationship between the magnet 26 and the shaft 12 can also be accurately determined by accurately determining the positional relationship between the end-plate 28 and the shaft 12. Furthermore, if the positional relationship between the magnet and the shaft 12 is accurately determined, the positional relationship between the magnet 26 and the stator 48 can also be accurately determined. Therefore, according to the present embodiment, an electric motor can be realized in which the relative position of the magnet 26 and the stator 48 is determined with a high level of accuracy.

In the present embodiment, because the opposing face 34 of the positioning portion 32 contacts the reference face 20 of the shaft 12, a fastening force of the nut 42 mainly acts on the positioning portion 32. Therefore, according to this configuration, it is possible to prevent the fastening force of the nut 42 from acting on the magnet 26.

Further, in the present embodiment, the large-diameter portion 16 of the shaft 12 is a stuff which is intended only to be inserted into the rotor sub-assembly 22, thus maintaining an outer diameter which mates by sockets and spigots with the second end-plate 38 over the entire area thereof. In addition, the large-diameter portion 16 is formed to be longer than an "internal length" of the rotor sub-assembly 22, that is, the "length from the opposing face 34 of the end-plate 28 to an end face on the base portion 14 side of the second end-plate 38" of the rotor sub-assembly 22. Therefore, in a state in which the relative position between the shaft 12 and the rotor sub-assembly 22 is determined, a clearance is reliably secured between the second end-plate 38 and the base portion 14, and no stress of any kind is applied from outside to the second end-plate 38. According to this configuration, it can be guaranteed that a fastening force of the nut 42 will not be allowed to act on the magnet 26.

The breaking strength of the magnet 26 decreases if the magnet 26 receives excessive stress in the axial direction. According to the present embodiment, the occurrence of a situation in which the stress that acts on the magnet 26 becomes excessive can be reliably prevented by not allowing a fastening force to act on the magnet 26. According to the present embodiment, in this respect also, the magnet 26 of the rotor 10 can be provided with excellent breaking strength.

Comparative Results of First Embodiment

Figure 2:
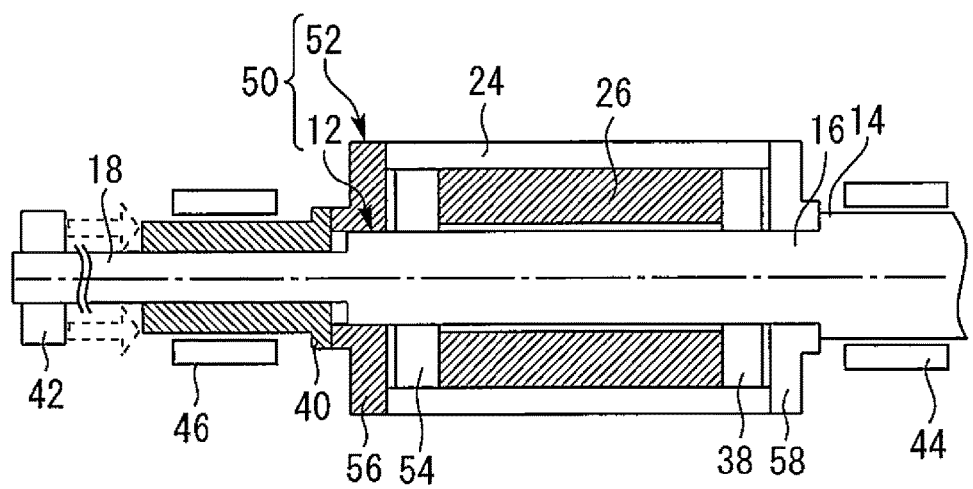
FIG. 2 illustrates the configuration of a comparative example (rotor 50) that is used for comparison with the rotor 10 shown in FIG. 1.

FIG. 2 illustrates the configuration of a comparative example (rotor 50) that is used for comparison with the rotor 10 shown in FIG. 1. Note that, elements in FIG. 2 that are the same as or correspond to constituent elements shown in FIG. 1 are assigned the same reference numbers as in FIG. 1 and a detailed description of such elements is omitted hereunder.

The rotor 50 shown in FIG. 2 includes a rotor sub-assembly 52. The rotor sub-assembly 52 has an end-plate 54 instead of the end-plate 28 shown in FIG. 1. Similarly to the second end-plate 38, the end-plate 54 is press-fitted into the ring-shaped member 24 so as to be completely housed inside the ring-shaped member 24.

The rotor sub-assembly 52 also includes a first spacer 56 on one end side of the ring-shaped member 24 (i.e., side of the small-diameter portion 18 in FIG. 2), and a second spacer 58 on the other end side of the ring-shaped member 24 (i.e., side of the base portion 14 in FIG. 2). The first spacer 56 and the second spacer 58 each contact against an end portion of the ring-shaped member 24, and are provided so as not to interfere with the end-plate 54 and the second end-plate 38.

Assembly of the rotor 50 is carried out according to the following procedure.

(1) Mounting of Second Spacer 58

The second spacer 58 has an inner diameter that is approximately equal to the large-diameter portion 16 of the shaft 12, and is mounted to the shaft 12 by mating sockets and spigots. In this stage, the second spacer 58 is assembled on the shaft 12 so as to contact against the end face of the base portion 14.

(2) Assembly of Ring-Shaped Member 24 and the Like

The magnet 26, the end-plate 54 and the second end-plate 38 are assembled in the ring-shaped member 24 by press-fitting. Next, the shaft 12 is inserted into the respective centers of the magnet 26, the end-plate 54 and the second end-plate 38 by mating sockets and spigots. Insertion of the shaft 12 proceeds until the end portion of the ring-shaped member 24 and the second spacer 58 come in contact.

(3) Mounting of First Spacer 56

Similarly to the second spacer 58, the first spacer 56 is also mounted to the shaft 12 by mating sockets and spigots, so as to contact the end portion of the ring-shaped member 24. The first spacer 56 is assembled on the shaft 12 so as to contact against the end face of the large-diameter portion 16.

(4) Mounting of Bearing Spacer 40

The bearing spacer 40 is mounted so as to contact against the end portion of the first spacer 56. As shown in FIG. 2, the first spacer 56 is formed so that the end portion thereof protrudes past the end face of the large-diameter portion 16 to the small-diameter portion 18 side. Consequently, in a state in which the bearing spacer 40 contacts the first spacer 56, a slight clearance is formed between the bearing spacer 40 and the end portion of the large-diameter portion 16.

(5) Fastening of Nut 42

After all of the elements have been mounted on the shaft 12, the nut 42 is fastened at the front end of the shaft 12. The fastening force of the nut 42 is transmitted to the bearing spacer 40. Since a clearance exists between the bearing spacer 40 and the large-diameter portion 16, the fastening force is only transmitted to the first spacer 56. The fastening force that is transmitted to the first spacer 56 is transmitted via the ring-shaped member 24 to the second spacer 58 without being transmitted to the end-plate 54. As a result, the rotor sub-assembly 52 is fixed to the shaft 12 in a state in which the second spacer 58 is pressed against the base portion 14 of the shaft 12.

According to the comparative example (rotor 50) shown in FIG. 2, similarly to the rotor 10 shown in FIG. 1, the following two effects can be achieved:

1. The rotor sub-assembly 52 is fixed to the shaft 12 at the appropriate position in the axial direction.

2. The fastening force of the nut 42 is not allowed to act on the magnet 26.

However, the rotor 50 uses the first spacer 56 and the second spacer 58 to achieve the above described two effects. In contrast, the rotor 10 of the present embodiment can achieve the above described two effects without the use of such spacers. Therefore, according to the rotor 10, in comparison to the rotor 50, the number of components and the assembling man-hours can be decreased, and the shaft length can also be shortened. Shortening the length of the rotor shaft in an electric motor leads to an improvement in noise characteristics and vibration characteristics. Therefore, according to the rotor 10 of the present embodiment, excellent noise and vibration characteristics can be realized in comparison to the rotor 50 of the comparative example.

Modifications of First Embodiment

In the above described first embodiment, the rotor sub-assembly 22 has the second end-plate 38 on the opposite side to the end-plate 28. Similarly to the end-plate 28, the second end-plate 38 fulfills a function of applying a moderate axial stress to the magnet 26, and also fulfills a function of ensuring the concentricity of the shaft 12 at the end portion of the rotor sub-assembly 22. However, the second end-plate 38 is not an essential element in the present invention. For example, under a condition in which the shaft length of the rotor sub-assembly 22 is sufficiently short, or a condition in which the breaking strength of the magnet 26 is adequate, the second end-plate 38 may be omitted.

Further, although the magnet 26 used in the above described first embodiment the magnet 26 has an annular shape, the present invention is not limited as such. That is, as long as the magnet 26 of the rotor 10 can generate a required magnetic field and secure the required rotational balance, and has the required strength, the magnet 26 may consist of a plurality of pieces.

Further, in the above described first embodiment, the length of the large-diameter portion 16 is longer than the internal length of the rotor sub-assembly 22. To prevent stress from acting on the magnet 26 in the axial direction, it is best for the side faces of the rotor sub-assembly 22 to be free, and in that respect the configuration of the present embodiment is the best. However, the configuration of the present invention is not limited thereto. That is, a region of the shaft 12 which has an outer diameter that can be inserted into the rotor sub-assembly 22 may be equal to or longer than the internal length of the rotor sub-assembly 22.

Furthermore, although in the above described first embodiment a member that imparts a fastening force to the rotor sub-assembly 22 is limited to the nut 42, the present invention is not limited to that structure. That is, a "fastening member" according to the present invention may be any kind of member as long as the member can cause a pressing force in the axial direction to act on the rotor sub-assembly 22 when the relevant member is fixed to the shaft 12.

Second Embodiment

Configuration of Second Embodiment

Figure 3:
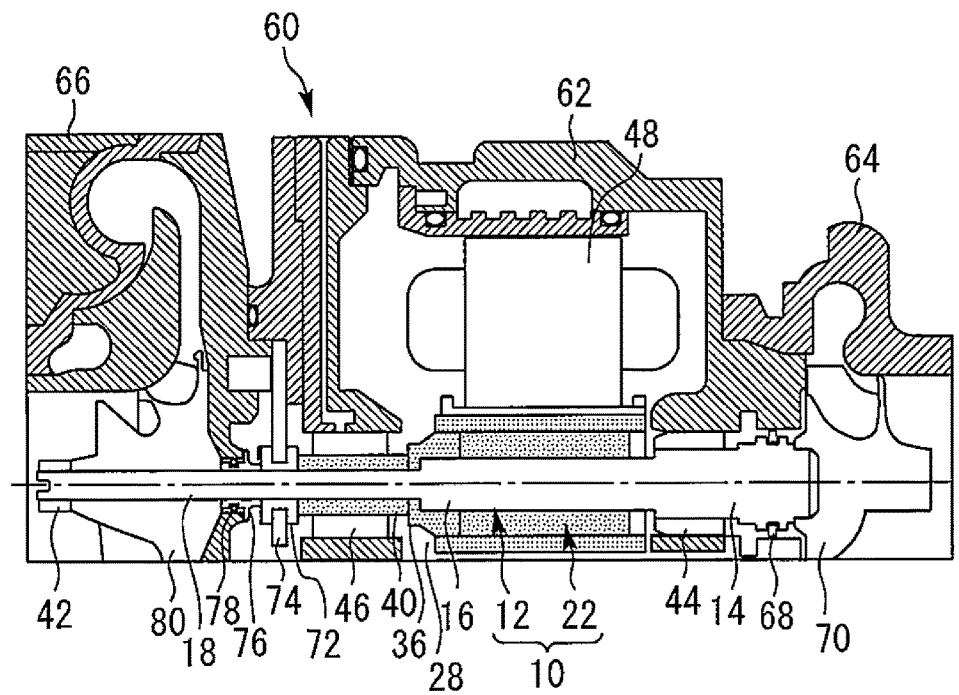
FIG. 3 is a cross-sectional view illustrating principal part of an electric-motor assisted supercharger 60 as a second embodiment of the present invention.

FIG. 3 is a cross-sectional view illustrating principal part of an electric-motor assisted supercharger 60 as a second embodiment of the present invention. As shown in FIG. 3, the electric-motor assisted supercharger 60 of the present embodiment includes the electric motor 11 shown in FIG. 1, that is, the rotor 10 and the stator 48. Hereunder, elements in FIG. 3 that are the same as or correspond to elements shown in FIG. 1 are assigned the same reference numbers as in FIG. 1 and a detailed description of such elements is omitted.

The electric-motor assisted supercharger 60 of the present embodiment includes a center housing 62. A turbine housing 64 is fixed on one side (right side in FIG. 3) of the center housing 62. A compressor housing 66 is fixed on the other side (left side in FIG. 3) of the center housing 62.

The rotor 10 is rotatably held by the bearings 44 and 46 that are disposed inside the center housing 62. Further, the stator 48 is housed inside the center housing 62 so as to surround the rotor sub-assembly 22.

In the present embodiment, the base portion 14 of the shaft 12 is formed so as to reach the inside of the turbine housing 64. Further, a seal ring 68 for preventing an outflow of oil from the center housing 62 to the turbine housing 64 is mounted on the base portion 14. Lubricating oil circulates inside the center housing 62 so that the oil is supplied to the bearings 44 and 46. Leakage of the oil into the turbine housing 64 can be prevented by the seal ring 68.

A turbine impeller 70 is housed inside the turbine housing 64. The turbine impeller 70 is fixed by welding it to the end portion of the base portion 14 of the shaft. The turbine housing 64 is formed so as to guide exhaust gas of an internal combustion engine that is not illustrated in the drawings to the turbine impeller 70. The turbine impeller 70 can give a rotational torque to the shaft 12 by receiving energy of the exhaust gas.

In the present embodiment, the small-diameter portion 18 of the shaft 12 is formed so as to reach the inside of the compressor housing 66. Further, in the present embodiment, a thrust collar 72 is mounted on the small-diameter portion 18 at a position that is adjacent to the bearing spacer 40. A thrust bearing 74 engages with the thrust collar 72. The thrust collar 72 and the thrust bearing 74 can restrict the axial position of the shaft 12 without restricting rotation of the shaft 12.

A seal ring collar 76 is mounted adjacent to the thrust collar on the small-diameter portion 18 of the shaft 12. A seal ring 78 that prevents an outflow of oil from the center housing 62 to the compressor housing 66 is mounted on the seal ring collar 76. According to this configuration, the lubricating oil for the bearings 44 and 46 that circulates inside the center housing 62 can be prevented from leaking out to the compressor housing 66.

A compressor impeller 80 is mounted on the small-diameter portion 18 of the shaft 12 so as to be positioned inside the compressor housing 66. In the present embodiment, the nut 42 is fastened at the end portion of the small-diameter portion 18 so as to fasten together the series of adjacent elements from the bearing spacer 40 to the compressor impeller 80. According to this configuration, the fastening force of the nut 42 can be caused to act on the pressure receiving face 36 of the end-plate 28 via the series of adjacent elements.

Comparative Results of Second Embodiment

Hereunder, effects obtained by the electric-motor assisted supercharger 60 will be described referring to FIG. 4 and FIG. 5.

Figure 4:
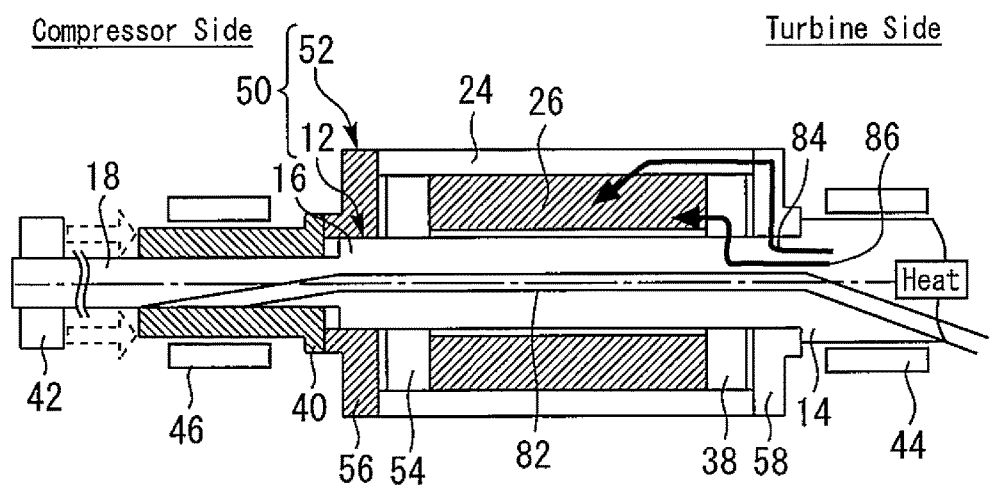
FIG. 4 is a view for explaining a phenomenon that arises in a case where the rotor 10 of the electric-motor assisted supercharger 60 is replaced with the rotor 50 of the comparative example shown in FIG. 2.

FIG. 4 is a view for explaining a phenomenon that arises in a case where the rotor 10 of the electric-motor assisted supercharger 60 is replaced with the rotor 50 of the comparative example shown in FIG. 2. A double folded line denoted by reference numeral 82 in FIG. 4 schematically represents a deformation that can arise in the shaft 12 accompanying with the fastening of the nut 42. Further, arrow lines denoted by reference numerals 84 and 86 in FIG. 4 schematically represent transmission routes of heat that arise in the turbine of the electric-motor assisted supercharger, respectively.

In a case where the rotor 50 shown in FIG. 4 is built into the electric-motor assisted supercharger 60, the fastening force of the nut 42 is transmitted from the bearing spacer 40 to the first spacer 56. The fastening force transmitted to the first spacer 56 is further transmitted to the base portion 14 of the shaft 12 from the second spacer 58 located at the turbine-side end portion of the rotor sub-assembly 52. When tightening the nut 42 on the shaft 12, a force that is produced as a result of the tightening may be transmitted from one member to another and may act as bending stress at a place to which the force is transmitted. In the case of the rotor 50, the bending stress is liable to act at a contact portion between the bearing spacer 40 and the first spacer 56 and at a contact portion between the second spacer 58 and the base portion 14. Therefore, when the electric-motor assisted supercharger is constructed using the rotor 50, a deformation arises in the shaft 12 on both the turbine side and the compressor side of the rotor sub-assembly 52 in some cases, as shown by the double folded line 82 in FIG. 4.

The influence on vibration and noise characteristics during rotation, which arises due to a deformation of the compressor side can be eliminated by subjecting the nut 42 to a balance correction process, for example. In contrast, it is difficult to perform such a balance correction process on the turbine side. Therefore, in a case where the electric-motor assisted supercharger 60 is constructed using the rotor 50, characteristics relating to vibration and noise are liable to deteriorate on the turbine side in particular.

In the electric-motor assisted supercharger 60, a large amount of heat is transmitted from the turbine side to the base portion 14 of the shaft 12. The magnetic performance of the magnet 26 will decline as the magnet 26 is exposed to heat. Consequently, in the electric-motor assisted supercharger 60, it is desirable that, as much as possible, heat that is conducted from the turbine side does not reach the magnet 26.

In the rotor 50, the second end-plate 38 contacts the shaft 12 at the large-diameter portion 16, and the second spacer 58 contacts the shaft 12 at the base portion 14 and the large-diameter portion 16. Consequently, inside the rotor 50, as shown by the two arrow lines in FIG. 4, the two routes described below are formed as routes that conduct heat to the magnet 26. Therefore, if the electric-motor assisted supercharger 60 is formed using the rotor 50, it is necessary to implement a countermeasure with regard to heat reaching the magnet 26 on the premise that these two routes exist.

First route 84: base portion 14 and large-diameter portion 16→second spacer 58→ring-shaped member 24→magnet 26

Second route 86: large-diameter portion 16→second end-plate 38→magnet 26

Figure 5:
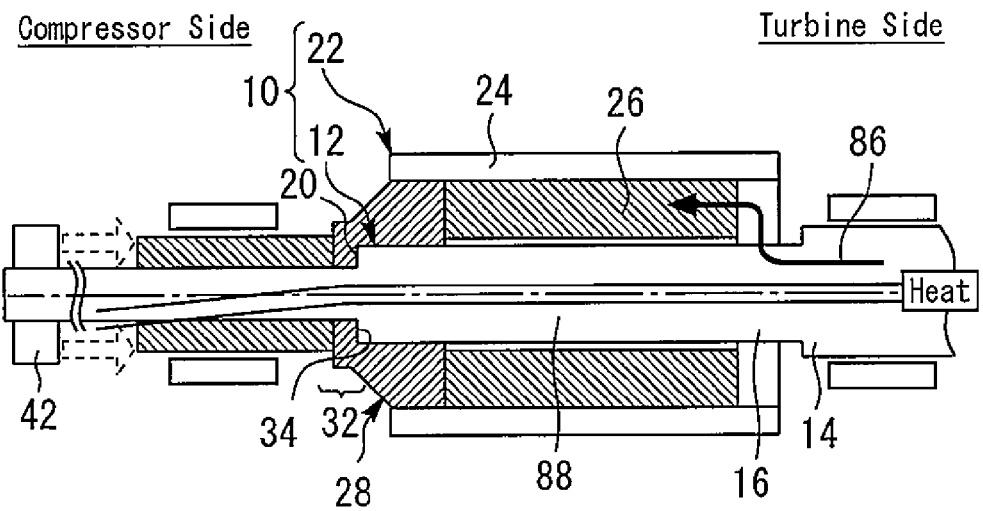
FIG. 5 is a view for explaining a phenomenon that arises in the rotor 10 inside the electric-motor assisted supercharger 60 of the present embodiment.

FIG. 5 is a view for explaining a phenomenon that arises in the rotor 10 inside the electric-motor assisted supercharger 60 of the present embodiment. A double folded line denoted by reference numeral 88 in FIG. 5 schematically represents a deformation that can arise in the shaft 12 due to the fastening of the nut 42. Further, an arrow line 86 indicates a heat conduction route that is the same as the second route 86 shown in FIG. 4.

According to the structure of the rotor 10, the fastening force of the nut 42 is transmitted from the bearing spacer 40 to the positioning portion 32, and is transmitted via the positioning portion 32 to the reference face 20 of the shaft 12. As described, in the rotor 10, the place to which a fastening force is transmitted from one member to another, that is, the place to which a force that is attributable to fastening of the nut 42 is transmitted as bending stress to the shaft 12 only accumulates at the compressor side of the rotor sub-assembly 22. Therefore, as shown by the folded line 88 in FIG. 5, a deformation of the shaft 12 due to the fastening of the nut 42 arises only in a region on the compressor side relative to the rotor sub-assembly 22.

As described above, the influence of a deformation that arises on the compressor side of the rotor sub-assembly 22 can be eliminated by performing a balancing process on the nut 42. Therefore, according to the configuration of the present embodiment, it is possible to realize the electric-motor assisted supercharger 60 that has excellent noise and vibration characteristics in comparison to the case of using the rotor 50 of the comparative example.

Further, the configuration of the rotor 10 does not include a spacer that comes in contact with the base portion 14. Hence, a heat conduction route that reaches the magnet 26 from the turbine side is limited to the second route 86 alone. Therefore, according to the configuration of the present embodiment, the thermal environment of the magnet 26 can be improved in comparison to the case using the rotor 50 of the comparative example.

Modification of Second Embodiment

Although in the above described second embodiment, a case is described in which the electric-motor assisted supercharger 60 is constructed using the rotor 10, devices which are suitable for use of the rotor 10 are not limited to an electric-motor assisted supercharger. For example, the rotor 10 is also suitable as an element for constituting an electric supercharger that is constituted by the electric motor 11 and a compressor. In this case, it is possible to dispose the compressor impeller 80 on either side of the rotor sub-assembly 22. However, because it will be possible to eliminate the influence of a deformation by means of the aforementioned balancing process, the compressor impeller 80 is preferably disposed between the end-plate 28 and the nut 42, similarly to the configuration in the present embodiment.

Third Embodiment

Figure 6:
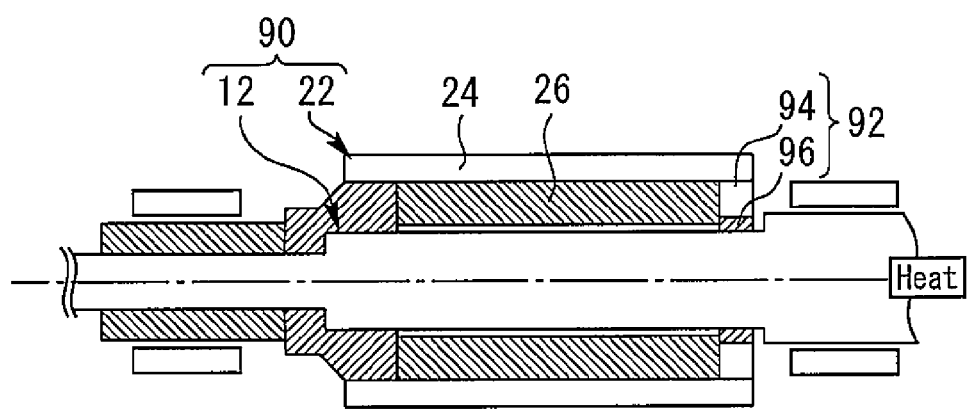
FIG. 6 illustrates the configuration of a rotor 90 that is used in the present embodiment.

Next, a third embodiment of the present invention will be described referring to FIG. 6. FIG. 6 illustrates the configuration of a rotor 90 that is used in the present embodiment. The rotor 90 is suitable as a constituent element of an electric-motor assisted supercharger, and can be used in place of the rotor 10 shown in FIG. 3. Note that, elements in FIG. 6 that are the same as or correspond to constituent elements of the rotor 10 are assigned the same reference numbers as in the rotor 10 and a detailed description of such elements is omitted hereunder.

The rotor 90 shown in FIG. 6 has the same configuration as the rotor 10 except that the second end-plate 38 is replaced by a turbine-side end-plate 92. The turbine-side end-plate 92 includes a press-fitting member 94 that is press-fitted into the ring-shaped member 24, and an annular heat insulating member 96 that is disposed on the inside of the press-fitting member 94. The heat insulating member 96 can be made of ceramic, for example, and is configured to be mountable on the large-diameter portion 16 of the shaft 12 by mating sockets and spigots.

According to the configuration of the rotor 90, a heat route (the second route 86 in FIG. 5) that runs from the large-diameter portion 16 of the shaft 12 to the magnet 26 can be effectively blocked. Therefore, according to the configuration of the present embodiment, an electric-motor assisted supercharger can be realized in which the thermal environment of the magnet 26 is further improved in comparison to the electric-motor assisted supercharger 60 shown in FIG. 3.

The invention claimed is:

1. An electric supercharger, comprising:
   a ring-shaped rotor sub-assembly including a ring-shaped member, a magnet and an end-plate;
   a shaft that passes through the rotor sub-assembly; and
   a nut that is fastened to the shaft to cause a pressing force in an axial direction to act on the rotor sub-assembly, and that fixes an axial position of the rotor sub-assembly with respect to the shaft;
   wherein:
   the magnet is disposed between the ring-shaped member and the shaft so as to contact an inner wall of the ring-shaped member;
   the shaft includes a step at which a shape of the shaft changes between a small-diameter portion and a large-diameter portion, and a reference face that is an end face of the large-diameter portion that is exposed to outside of the small-diameter portion; and
   the end-plate includes a positioning portion, which is fixed to the ring-shaped member so as to oppose an axial end portion of the magnet, said positioning portion includes an opposing face contacting the reference face and a pressure receiving face receiving the pressing force produced by the nut, and said small-diameter portion is inserted into the positioning portion;
   said electric supercharger further comprising;
   a stator of an electric motor that is disposed at an outer circumference of the rotor sub-assembly; and
   a compressor impeller that is mounted to the shaft so as to be positioned between the pressure receiving face of the positioning portion and the nut,
   wherein the end-plate is mounted to the ring-shaped member so as to contact the axial end portion of the magnet.

2. The electric supercharger according to claim 1, wherein:
   said opposing face of the positioning portion of the end-plate faces the magnet, and said opposing face of the positioning portion contacts the reference face of the shaft;
   an outer diameter of the shaft is maintained at a diameter that is less than an inner diameter of the magnet over a length that is equal to or greater than an internal length of the rotor sub-assembly from the reference face; and
   the internal length is a length from the opposing face of the positioning portion to an end portion of the rotor sub-assembly on a different side to the positioning portion.

3. An electric-motor assisted supercharger, comprising:
   an electric supercharger according to claim 2;
   a turbine impeller that is mounted to the shaft so as to be positioned on an opposite side to the compressor impeller so as to sandwich the rotor sub-assembly therebetween; and
   a turbine housing that guides exhaust gas of an internal combustion engine to the turbine impeller.

4. The electric-motor assisted supercharger according to claim 3, wherein:
   the rotor sub-assembly further comprises a turbine-side end-plate that is mounted to the ring-shaped member so as to oppose a second axial end portion of the magnet from a turbine impeller side, and that allows passage of the shaft therethrough; and
   the turbine-side end-plate comprises a ceramic ring at a site that contacts the shaft.

* * * * *